A. B. HUNT.
Horse Hay Fork.
No. 96,810. Patented Nov. 16, 1869.
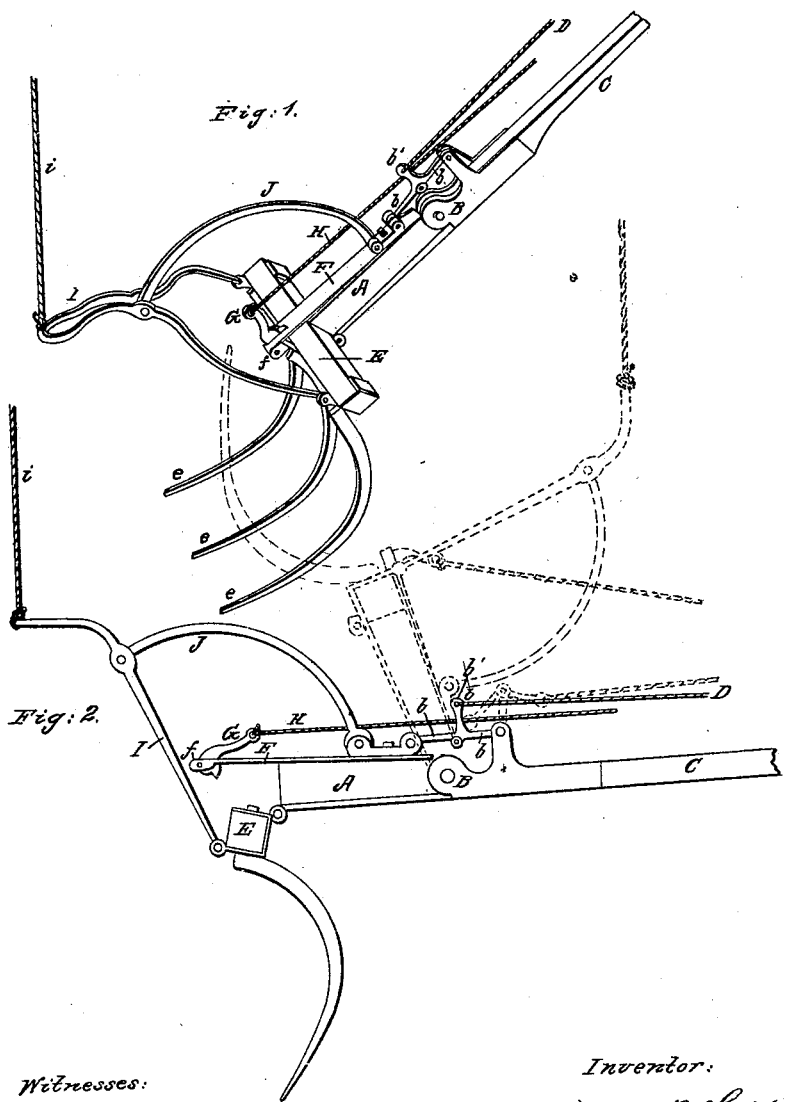

United States Patent Office.

AMOS B. HUNT, OF MATTESON, MICHIGAN.

Letters Patent No. 96,810, dated November 16, 1869.

IMPROVEMENT IN HORSE HAY-FORKS.

The Schedule referred to in these Letters Patent and making part of the same.

*To whom it may concern:*

Be it known that I, AMOS B. HUNT, of Matteson, in the county of Branch, and State of Michigan, have invented a new and useful Improvement in Horse Hay-Pitchfork; and I do declare that the following is a true and accurate description thereof, reference being had to the accompanying drawings, and to the letters of reference marked thereon, and being a part of this specification, in which—

Figure 1 is a perspective view of my pitchfork, showing it ready to take a load, and Figure 2 is a side elevation of the same as it appears when its load is discharged.

Like letters refer to like parts in each figure.

The nature of this invention relates to the construction of an improved horse hay-pitchfork, and consists in so arranging the parts of a suspended fork, that hay may be taken from a wagon on the floor, and elevated and discharged into the mow at any desired point with ease and rapidity by it.

The present invention is operated at the greatest advantage, if used in connection with the elevating-crane, patented by me, October 27, 1868.

In the drawings—

A represents a handle, to which is secured, by the hinge B, the pole C, allowing the handle and pole-ends to be raised above a horizontal plane. The pole and handle are also connected by a toggle-joint, $b$, on the upper side, the toggle-arm, toward the rear, having a lever, $b'$, to which is attached a cord, D. When the pole is straightened to an extension of the line of the handle, the toggle-joint drops into the position shown in fig. 2, and there retains it until released by pulling on the cord D.

To the end of the handle is hinged a fork-head, E, provided with tines $e$. At the top of the handle, and extending beyond its end, is secured a half-leaf spring, F, having a shoulder, $f$, on its lower side, through and in a slot in which, is hung a tripper, G, to which is attached a tripping-line, H. When the fork is swung up, the square head E raises the spring F, until its corner passes the shoulder $f$, which then drops down over the front edge and secures it. To release the fork, pull on the tripping-line, when the cam-tripper G will raise the spring, and thus release the head.

I is a bail, hinged to each end of the head E, by means of which bail the fork is suspended from an elevating-crane, the elevating-rope being shown at $i$.

J is a radius-arm, hinged to the bail I and head A, so arranged that when the fork is set, as in fig. 1, the whole can be moved at the will of the operator by pushing with the pole C in the desired direction.

To unload hay from a wagon on the floor and pitch into the mow, the operator stands on a scaffold at the top of the bay, over the load. The fork being set, as shown in fig. 1, he thrusts the tines into the load. The horse attached to the elevating-rope is then started up. At the same time the operator pulls the cord D, when, the tines being curved, will draw under the hay and take up a load. When the fork is raised, until the pole and handle are horizontal, the toggle-joint $b$ will drop and lock them in that position. The operator then pushes the fork and its load over the bay, and to the right or left, if he wishes, and when the fork is over the desired spot, pulls the tripping-line H and dumps the load, returning the empty fork to the wagon. When the tines strike the hay, the fork resets itself, when the operation may be repeated.

The fork is equally well adapted to loading hay from the mow into a rack on the floor, or pitching hay through a high door or window, but will prove most effective when used in connection with my elevating-crane.

What I claim as my invention, and desire to secure by Letters Patent, is—

1. The toggle-joint $b$ and its lever $b'$, in connection with the handle A, the hinge B, and the pole C, when constructed, arranged, and operating as and for the purpose set forth.

2. In combination with the toggle-joint $b$ and its lever $b'$, the bail I and radius-arm J, when constructed, arranged, and operating as and for the purpose specified.

AMOS B. HUNT.

Witnesses:
H. F. EBERTS,
L. J. HUNT.